| (12) | United States Patent | (10) Patent No.: | US 9,337,877 B2 |
|---|---|---|---|
| | Rozental et al. | (45) Date of Patent: | May 10, 2016 |

(54) METHOD AND SYSTEM FOR MULTIBAND INTERFERENCE MITIGATION WITH MULTIPATH CANCELLATION

(71) Applicant: MOTOROLA SOLUTIONS, INC., Schaumburg, IL (US)

(72) Inventors: Mark Rozental, Gedera (IL); Nir Corse, Rishon Le-Zion (IL); Kevin G. Doberstein, Elmhurst, IL (US); Ovadia Grossman, Tel Aviv-Yaffo (IL)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/263,600

(22) Filed: Apr. 28, 2014

(65) Prior Publication Data

US 2015/0311931 A1    Oct. 29, 2015

(51) Int. Cl.
*H03D 1/00* (2006.01)
*H04L 27/06* (2006.01)
*H04B 1/10* (2006.01)
*H04B 1/709* (2011.01)
(Continued)

(52) U.S. Cl.
CPC .............. *H04B 1/1081* (2013.01); *H04B 1/123* (2013.01); *H04B 1/525* (2013.01); *H04B 1/709* (2013.01)

(58) Field of Classification Search
CPC .............................. H04B 1/126; H03F 1/3235
USPC .......................................................... 375/343
See application file for complete search history.

(56) References Cited

U.S. PATENT DOCUMENTS 5,444,864 A * 8/1995 Smith .................... H04B 1/525
455/24

7,916,671 B1 * 3/2011 Zortea .................... H04L 27/362
370/286
2002/0191779 A1 * 12/2002 Pham ....................... 379/406.08
(Continued)

FOREIGN PATENT DOCUMENTS

EP         758823 A2    2/1997
EP         1941624 A1   7/2008
(Continued)

OTHER PUBLICATIONS

International Search Report and Written Opinion for corresponding International Patent Application No. PCT/US2015/026156, mailed on Jun. 29, 2015.

*Primary Examiner* — Sam K Ahn
*Assistant Examiner* — Fabricio R Murillo Garcia
(74) *Attorney, Agent, or Firm* — Daniel R. Bestor (57) ABSTRACT

A method and apparatus is provided for mitigating multiband self-interference using multipath cancellation. A dual-band transceiver receives an incoming radio-frequency signal that includes a multipath self-interference component generated by the transmission of an outgoing radio-frequency signal. The transceiver creates a plurality of reference signals from the outgoing radio-frequency signal by introducing delay values with respect to the outgoing signal. The transceiver adjusts the amplitude and phase of each of the delayed reference signals and combines the resulting signals with the incoming radio-frequency signal to cancel the self-interference component. The delay values may be determined adaptively. The systems and methods described herein are particularly useful for dual-band transceivers capable of communicating simultaneously using Long-Term Evolution (LTE) wideband signals and Public-Safety Narrowband (PSNB) signals.

12 Claims, 5 Drawing Sheets

(51) Int. Cl.
*H04B 1/525* (2015.01)
*H04B 1/12* (2006.01)

(56) References Cited

U.S. PATENT DOCUMENTS

| | | |
|---|---|---|
| 2005/0207509 A1 | 9/2005 | Saunders et al. |
| 2007/0281655 A1* | 12/2007 | Ishikawa ............... H04L 25/061 455/296 |
| 2013/0121381 A1* | 5/2013 | Smiley .......................... 375/146 |
| 2014/0099893 A1 | 4/2014 | Kheirkhahi et al. |
| 2014/0348018 A1* | 11/2014 | Bharadia ............... H04L 5/1461 370/252 |
| 2014/0376416 A1* | 12/2014 | Choi ............................. 370/277 |

FOREIGN PATENT DOCUMENTS

| | | |
|---|---|---|
| WO | 9946887 A3 | 10/1999 |
| WO | 2009158436 A1 | 12/2009 |
| WO | 2012106262 A1 | 8/2012 |

\* cited by examiner

METHOD AND SYSTEM FOR MULTIBAND INTERFERENCE MITIGATION WITH MULTIPATH CANCELLATION

BACKGROUND OF THE INVENTION

Given the increased proliferation of wireless radio communication standards employing different portions of the radio frequency spectrum, it is useful to provide users with portable equipment capable of handling communications in more than one frequency band. At the same time, the communication spectrum is becoming increasingly crowded, and in particular, communications on one band can cause out-of-band emissions (OOBE) that tend to interfere with communications on another band, particularly with communications on a neighboring frequency band. The problem of out-of-band emissions can lower communications rates when a device is attempting to receive a transmission on one band while a nearby transmitter is transmitting on a neighboring band. This problem is particularly acute in the case of a dual-band device designed to receive and transmit on different bands simultaneously.

Accordingly, there is a need for methods and systems for multiband interference mitigation with multipath cancellation.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In an exemplary embodiment of a multipath signal cancellation method, a transceiver receives an incoming radio-frequency signal, wherein the incoming radio-frequency signal includes a self-interference component generated by the transmission of an outgoing radio-frequency signal. The transceiver creates a plurality of reference signals from the outgoing radio-frequency signal. Each of these reference signals is a replica of the outgoing radio-frequency signal, and each of the reference signals has a unique delay value with respect to the outgoing radio-frequency signal. The transceiver adjusts the amplitude and phase of each of the reference signals to generate a plurality of respective cancellation signals. The transceiver then creates an error signal by combining the plurality of respective cancellation signals with the incoming radio-frequency signal to cancel at least a portion of the self-interference component. The adjustment of the amplitude and phase of the reference signals performed by the transceiver is based on the error signal.

The systems and methods described herein are particularly useful for dual-band transceivers capable of communicating simultaneously using Long-Term Evolution (LTE) wideband signals and Public-Safety Narrowband (PSNB) signals. In particular, these systems and methods may be used in a an integrated dual-band transceiver that operates to send wideband signals on LTE 3GPP Band 13 (777-787 MHz) while receiving signals on the 700 MHz PSNB band (769-775 MHz).

Figure 1:
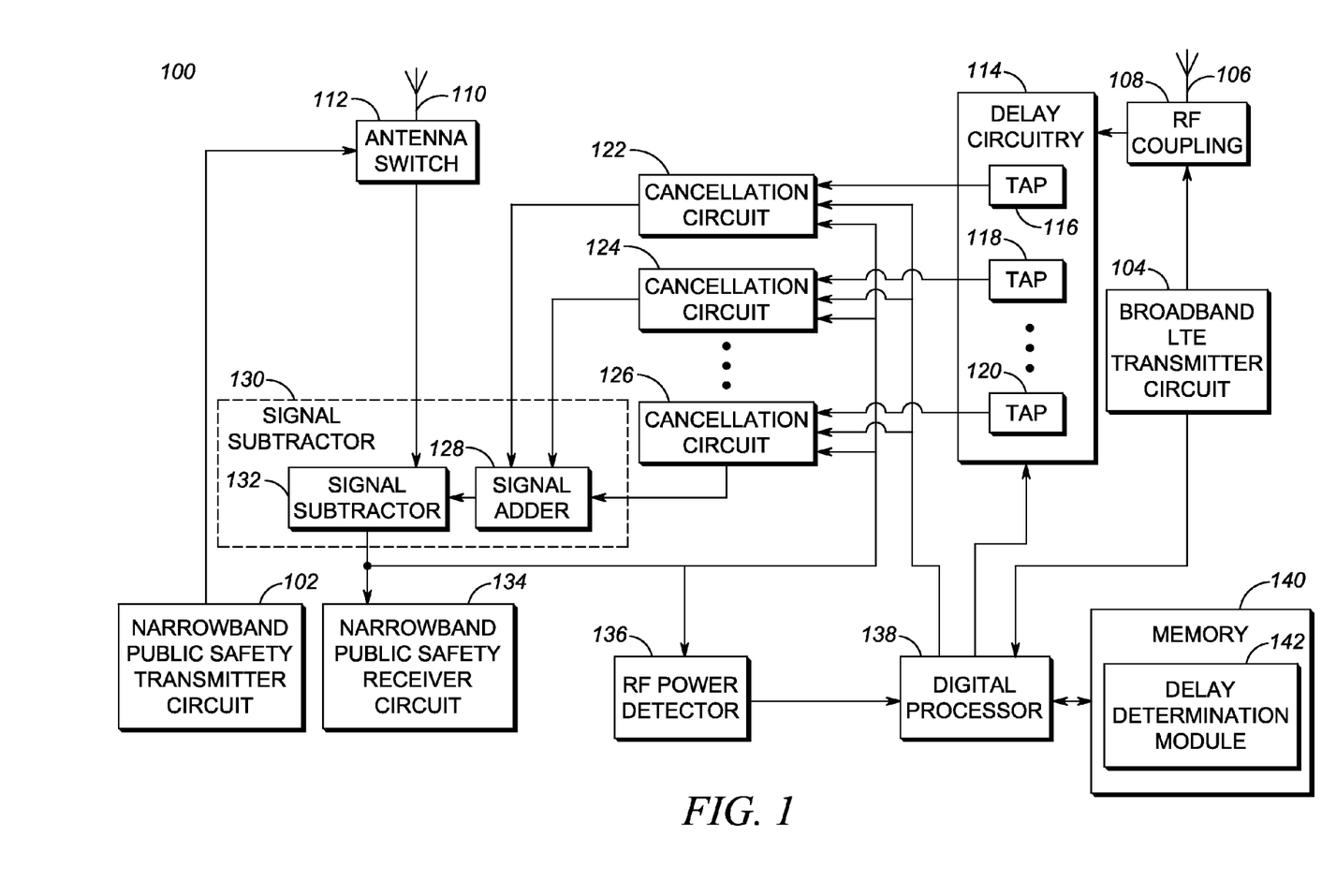
FIG. 1 is a block diagram of a dual-band transceiver in accordance with some embodiments.

FIG. 1 is a block diagram of a dual-band transceiver 100. The transceiver 100 includes a narrowband public safety transmitter circuit 102 and a broadband LTE transmitter circuit 104. The transmitter circuit 104 is operative to generate an outgoing radio-frequency signal, and it is coupled to a transmit antenna 106 through a radio frequency coupling 108. The transceiver is also provided with a receive antenna 110. In some embodiments, the receive antenna 110 is switchable through an antenna switch 112 to permit transmission from antenna 110 of outgoing radio frequency signals generated by the narrowband public safety transmitter circuit 102.

In the operation of the transceiver 100, incoming radio-frequency signals are received at the receive antenna 110. When an outgoing radio frequency signal from the broadband LTE transmitter circuit is being transmitted from the transmit antenna 106, this causes some amount of interference in the receipt of signals by the receive antenna 110. The incoming radio-frequency signal received at the receive antenna 110 thus includes a self-interference component that can interfere with the detection of any desired radio-frequency signal, such as an incoming public safety narrowband signal.

The transceiver 100 is provided with componentry to permit cancellation of at least a portion of the self-interference component. The radio frequency coupling 108, which may be, for example, an inductive coupling, replicates the outgoing radio-frequency signal and feeds that signal to delay circuitry 114. In turn, delay circuitry 114 produces one or more reference signals based on one or more delays introduced to the coupled outgoing radio-frequency signal. Delay circuitry 114 may be implemented by, for example, a series of L/C circuits, by a transmission line, delay line, or by other techniques of generating a delay in an analog signal. In the example of FIG. 1, the transceiver 100 includes a plurality of taps 116, 118, 120 at which different durations of delay may be selected. In some embodiments, delays having a duration ranging from between zero and 500 ns may be selected depending on the choice of tap.

Preferably, each delay is unique, so that no two delays are exactly the same. In some embodiments, the delay value of at least one of the reference signals is at least 10 ns, and in some embodiments, at least one of the delay values is at least 100 ns. Generally, at least one of the delay values is substantially greater than a period of the outgoing radio-frequency signal. For example, at least one of the delay values may be more than ten times greater than the period of the outgoing radio-frequency signal. In some embodiments, at least one of the delay values may be more than 100 times greater than the period of the outgoing radio frequency signal.

In some embodiments, the outgoing radio-frequency signal is an LTE uplink signal, such as a signal in LTE 3GPP Band 13 (B13), and the incoming radio-frequency signal includes a desired radio-frequency component in the 700 MHz public safety spectrum. In some embodiments, the desired radio-frequency component is in the 800 MHz public safety spectrum. In some embodiments, the systems and methods described herein are employed in a dual-band transceiver, which may include an LTE wideband transmitter and a Public-Safety Narrowband (PSNB) narrowband receiver.

The transceiver 100 is provided with a plurality of cancellation circuits 122, 124, 126. While three cancellation circuits are illustrated in FIG. 1, a different number of cancellation circuits may alternatively be used. In some embodiments, one of the cancellation circuits (e.g. circuit 122) is connected directly to the radio frequency coupling 108 rather than being connected through the delay circuitry 114.

The delayed replicas of the outgoing radio-frequency signal serve as reference signals for the cancellation circuits 122, 124, 126. The cancellation circuits adjust the amplitude and phase of the respective reference signals (using technique described in greater detail below) to generate a respective cancellation signal. These cancellation signals are supplied to a signal subtractor 130, which subtracts the cancellation signals from the incoming radio-frequency signal to generate an error signal. In some embodiments, the signal subtractor 130 is implemented in two stages with a signal adder 128, which sums the cancellation signals, followed by a two-input subtractor 132, which then subtracts the summed cancellation signals from the incoming radio-frequency signal to generate the error signal.

The error signal from the subtractor 130 is then fed back to the cancellation circuits 122, 124, 126 (and any additional cancellation circuits). The cancellation circuits use the error signal to determine the phase and amplitude shift of the respective cancellation signals. Generally speaking, the cancellation circuits adjust their respective error signals to more closely correlate to the phase and amplitude of the error signal so as to minimize the self-interference component of the error signal. The specifics of this correlation operation are discussed in greater detail below.

The exemplary transceiver 100 is provided with a narrowband public safety receiver circuit 134. When the incoming radio-frequency signal includes a desired signal in a public safety band, the receiver circuit 134 operates on the error signal according to known procedures to demodulate and decode the incoming signal. In some embodiments, the receiver circuit 134 is operative to receive and process desired signals in the 700 MHz public safety spectrum and/or the 800 MHz public safety spectrum.

In some embodiments, the delay value of each of the cancellation circuits is predetermined. In other embodiments, the delay values are selected adaptively according to the varying conditions in which the transceiver 100 is operated. Heuristically, it is desirable for the delay value of each of the cancellation circuits to correspond to the travel time along a respective multipath self-interference path. For example, the delay period of the cancellation circuit 122 may be substantially zero to correspond with the transmission time along a direct path from the transmit antenna 106 to the receive antenna 110, while the delay period of the cancellation circuit 124 may correspond to the travel time along a self-interference path from the transmit antenna 106, to a nearby reflective obstacle (such as a building), and back to the receive antenna 110. Such a travel time may be, for example, on the order of 300 ns.

While it is useful heuristically to envision each delay value as corresponding to the travel time for a particular self-interference path, it is not necessary for each delay value to correspond precisely to such a travel time. For example, a delay value may differ from the actual travel time of a self-interference path by 60 ns or more, and the transceiver 100 can still provide satisfactory self-interference cancellation. The selection of a delay value is conducted separately from the phase adjustment performed by the cancellation circuits. Indeed, at least one of the delay values is preferably at least 10 times as great as the period of the outgoing radio-frequency signal. For example, at least one of the delay values is preferably greater than 10 ns. In preferred embodiments, the delay values are unique delay values between zero and 500 ns. The different delay values preferably differ from one another by at least 10 ns. In some embodiments, the delay values may differ from one another by at least 40 ns.

In some embodiments, the delay values of at least some of the cancellation circuits 122, 124, 126 are determined adaptively according to the conditions in which the transceiver 100 is being operated at a particular time. In such embodiments, the transceiver 100 is provided with a radio-frequency power detector 136 to determine the power of the error signal. A digital processor 138 is in communication with the power detector 136 and with the delay circuitry 114 to adjust one or more of the delays in an effort to minimize the power of the error signal. The process employed by the digital processor 138 may be stored at a non-volatile computer-readable memory 140 as computer-readable instructions that are executable by the processor 138. The computer readable instructions for performing the process may be stored in the memory 140 as a delay determination software module 142. The processor 138 may also be in communication with the LTE transmitter circuit 104 and with the cancellation circuits 122, 124, 126 to enable those cancellation circuits while the LTE transmitter circuit is transmitting and to disable those cancellation circuits while the LTE transmitter circuit is not transmitting.

Figure 2:
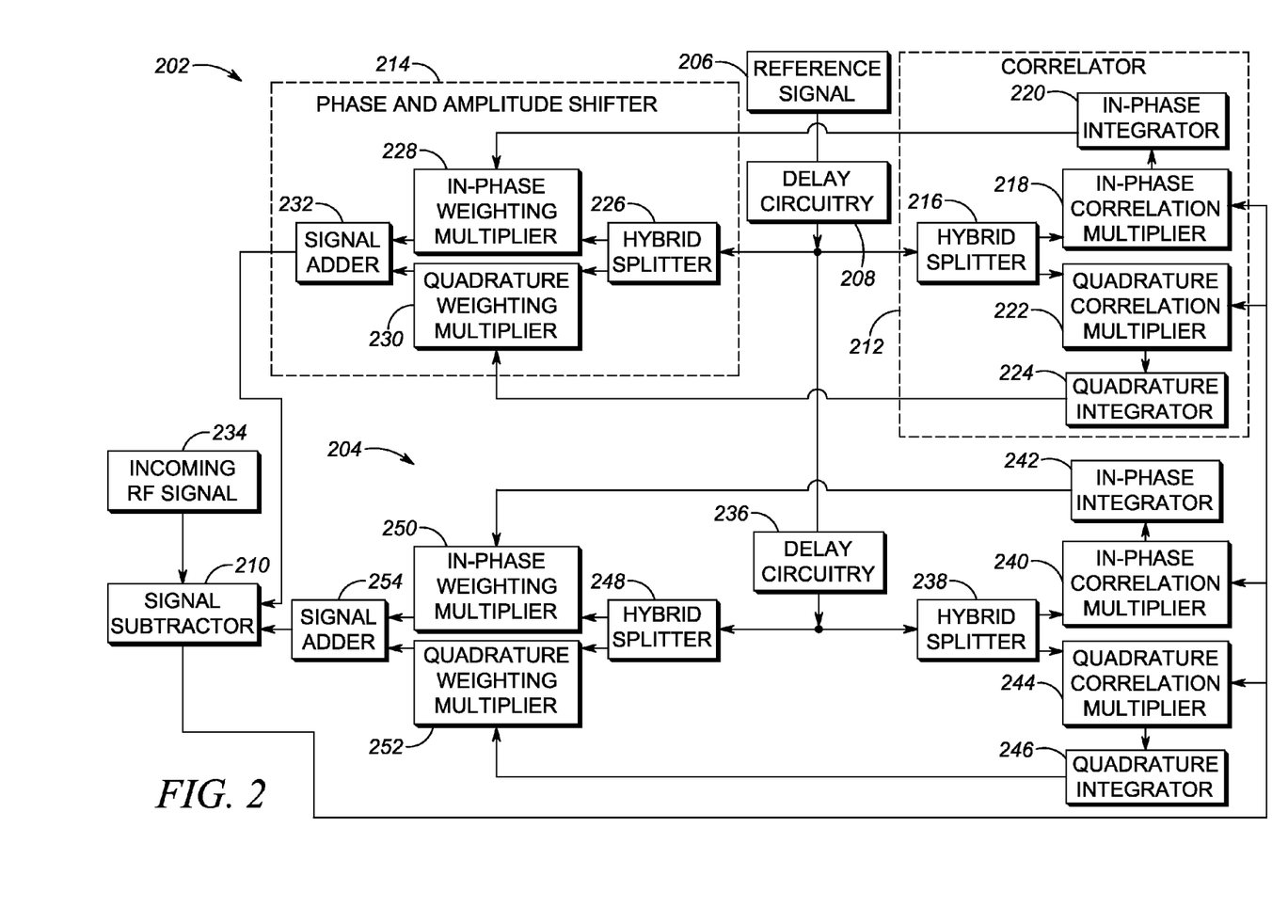
FIG. 2 is a block diagram of signal cancellation circuitry in in accordance with some embodiments.

The operation of signal cancellation circuits, such as cancellation circuits 122, 124, and 126, is illustrated in greater detail in FIG. 2. Illustrated in FIG. 2 is a first cancellation circuit 202 and a second cancellation circuit 204. A reference signal 206 is provided by replicating an outgoing radio-frequency signal, for example, by coupling a sampled version of the signal to the cancellation circuitry. The reference signal passes through a delay circuitry 208 (analogous to delay circuitry 114 of FIG. 1) to provide a delayed reference signal to the first cancellation circuit 202.

The cancellation circuits 202, 204 receive an error signal from a subtractor 210 (analogous to subtractor 130 of FIG. 1). The first cancellation circuit includes a correlator 212 and an amplitude and phase shifter 214. The correlator 212 includes a hybrid splitter 216 that splits the delayed reference signal into a reference in-phase component and a reference quadrature component, where the reference quadrature component leads the in-phase component by one quarter cycle, such that the in-phase and quadrature components differ by a phase of pi/2. The reference in-phase component of the hybrid splitter 216 is fed to a multiplier 218, where it is multiplied by the error signal. Because several multipliers are employed in the circuitry of FIG. 2, multiplier 218 is referred to herein as an in-phase correlation multiplier, and analogous monikers are used for other multipliers. This naming convention is employed as a convenience and is not intended to be limiting as to the type of multiplier employed. The product of the multiplier 218 is supplied to an integrator 220 (referred to herein, for convenience of notation, as an in-phase integrator). The output of the integrator 220 represents a reference in-phase weight corresponding to the in-phase correlation of the error signal.

Similarly, the reference quadrature component of the hybrid splitter 216 is fed to a quadrature correlation multiplier 222, where it is multiplied by the error signal. The product of the multiplier 222 is supplied to a quadrature integrator 224. The output of the quadrature integrator 224 represents a reference quadrature weight corresponding to the quadrature correlation of the error signal.

The phase and amplitude shifter 214 includes another hybrid splitter 226 that is coupled to each of an in-phase weighting multiplier 228 and a quadrature weighting multiplier 230. In some embodiments, the functions of hybrid splitters 216 and 226 may be performed by a single hybrid splitter. Hybrid splitter 226 splits the delayed reference signal into a reference in-phase component and a reference quadrature component and respectively routes the reference in-phase and quadrature components to the in-phase and quadrature weighting multipliers 228, 230. The in-phase weighting multiplier 228 weights the reference in-phase component by multiplying the reference in-phase component by the reference in-phase weight to create an in-phase cancellation component. Similarly, the quadrature weighting multiplier 230 weights the reference quadrature component by multiplying the reference quadrature component by the reference quadrature weight to create a quadrature cancellation component. A signal adder 232 combines the in-phase cancellation component with the quadrature cancellation component to generate a cancellation signal. That cancellation signal is then subtracted from the incoming radio frequency signal 234 by the signal subtractor 210.

Cancellation circuit 204 operates in a manner similar to circuit 202, except that the reference signal supplied to cancellation circuit 204 is subjected to an additional delay introduced by delay circuitry 236 (delay circuitry 208 and 236 being analogous to delay circuitry 114 of FIG. 1). A hybrid splitter 238 splits the delayed reference signal into a reference in-phase component and a reference quadrature component. The reference in-phase component of the hybrid splitter 238 is fed to an in-phase correlation multiplier 240, where it is multiplied by the error signal. The product of the multiplier 240 is supplied to an in-phase integrator 242. The output of the integrator 242 represents a reference in-phase weight corresponding to the in-phase correlation of the error signal. The reference quadrature component of the hybrid splitter 238 is fed to a quadrature correlation multiplier 244, where it is multiplied by the error signal. The product of the multiplier 244 is supplied to a quadrature integrator 246. The output of the quadrature integrator 246 represents a reference quadrature weight corresponding to the quadrature correlation of the error signal.

Cancellation circuit 204 is provided with another hybrid splitter 248 that is coupled to each of an in-phase weighting multiplier 250 and a quadrature weighting multiplier 252. Again, in some embodiments, the functions of hybrid splitters 238 and 248 may be performed by a single hybrid splitter. Hybrid splitter 248 splits the delayed reference signal into a reference in-phase component and a reference quadrature component and respectively routes the reference in-phase and quadrature components to the in-phase and quadrature weighting multipliers 250, 252. The in-phase weighting multiplier 250 weights the reference in-phase component by multiplying the reference in-phase component by the reference in-phase weight to create an in-phase cancellation component. Similarly, the quadrature weighting multiplier 252 weights the reference quadrature component by multiplying the reference quadrature component by the reference quadrature weight to create a quadrature cancellation component. A signal adder 254 (signal adders 232 and 254 being analogous to signal adder 128 of FIG. 1) combines the in-phase cancellation component with the quadrature cancellation component to generate a cancellation signal. That cancellation signal (and the cancellation signal from cancellation circuit 202) is subtracted from the incoming radio frequency signal 234 by the signal subtractor 210. In preferred embodiments, all of the cancellation circuits 202, 204 are provided with the same error signal. As in the transceiver 100 of FIG. 1, the error signal generated by the signal subtractor 210 in FIG. 2 may also be supplied to a conventional receiver circuit for demodulating and decoding a desired component of the incoming radio-frequency signal.

Figure 3:
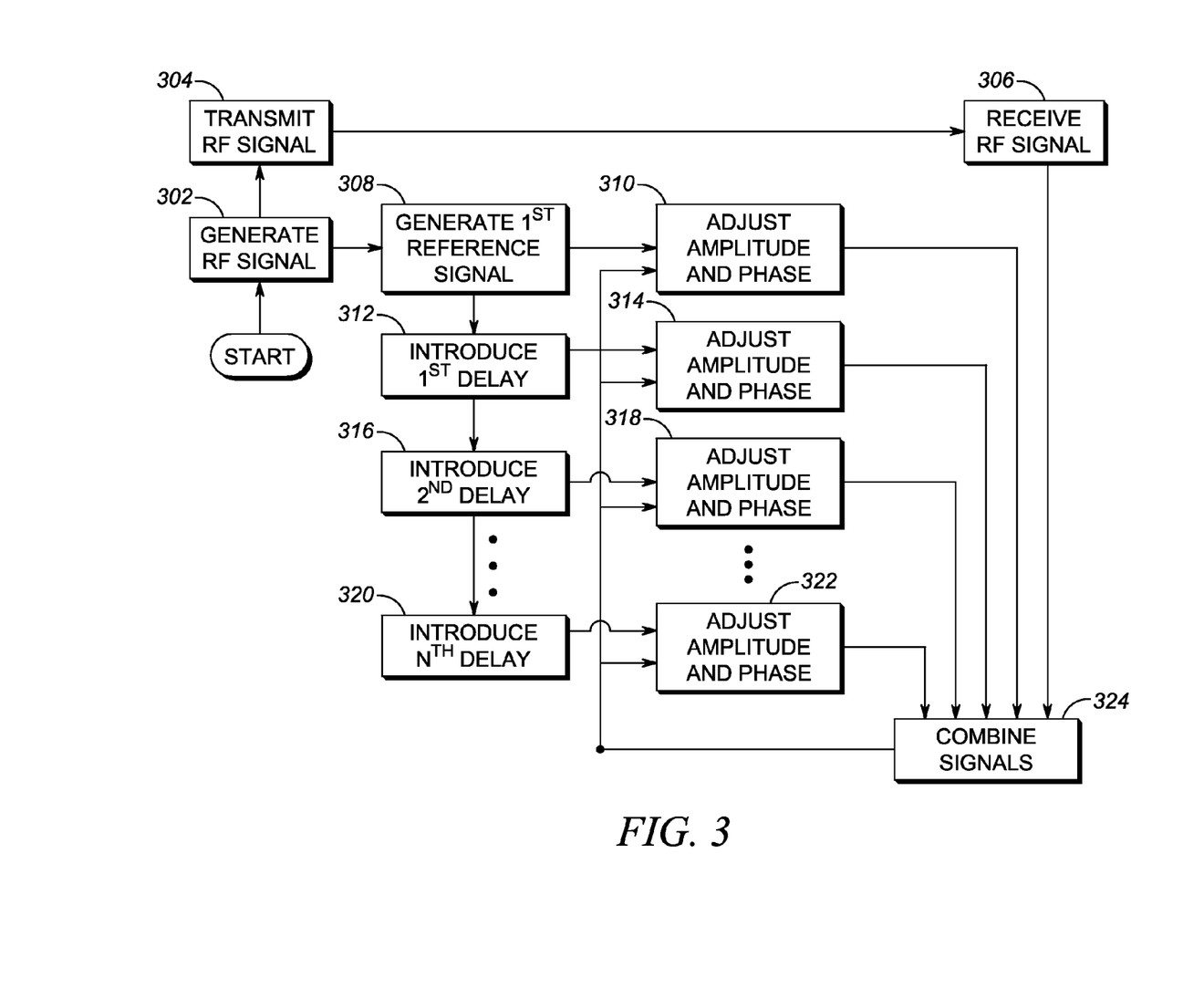
FIG. 3 is a flow diagram of a signal cancellation method in accordance with some embodiments.

A method performed by an exemplary transceiver, such as transceiver 100, is illustrated in the flow chart of FIG. 3. In step 302, the transceiver generates an outgoing radio-frequency signal, which may be, for example, an LTE uplink signal. In step 304, the transceiver transmits the outgoing radio-frequency signal from a transmit antenna. In step 306, the transceiver receives the transmitted radio-frequency signal as a self-interference component at a receive antenna. The self-interference component received in step 306 may include not only a component sent in a straight line from the transmit antenna to the receive antenna, but also components that have traveled different, longer paths from the transmit antenna to the receive antenna, such as components that have reflected off of nearby obstacles before reaching the receive antenna, resulting in multipath self-interference.

To assist in the cancellation of the multipath self-interference, the transceiver generates, in step 308, a first reference signal. In some embodiments, a delay is introduced in the first reference signal. In other embodiments, the first reference signal is generated without any delay (other than delay inherent in the transmission of the reference signal to the cancellation circuit). In step 310, the transceiver adjusts the amplitude and phase of the first reference signal to generate a first cancellation signal. In step 312, the transceiver introduces a first delay with respect to the outgoing radio-frequency signal to generate a second reference signal, and in step 314, the transceiver adjusts the amplitude and phase of the second reference signal to generate a second cancellation signal. Similarly, in step 316, the transceiver introduces a second delay with respect to the outgoing radio-frequency signal to generate a third reference signal, and in step 318, the transceiver adjusts the amplitude and phase of the third reference signal to generate a third cancellation signal.

The method illustrated in FIG. 3 may be implemented using various numbers of cancellation signals. Generally speaking, in step 320, the transceiver introduces an Nth delay with respect to the outgoing radio-frequency signal to generate an (N+1)th reference signal, and in step 322, the amplitude and phase of the (N+1)th reference signal is adjusted to generate an (N+1)th cancellation signal.

In step 324, the incoming radio-frequency signal received at step 306 is combined with the first through the (N+1)th cancellation signal to create an error signal by cancelling out at least a portion of the self-interference component of the incoming radio-frequency signal. For example, the cancellation signals may all be subtracted from the incoming radio-frequency signal, or the cancellation signals may all be added together to generate a combined cancellation signal that is then subtracted from the incoming radio-frequency signal.

The phase and amplitude adjustments in steps 310, 314, 318, and 322 are based on the error signal created in step 324. Specifically, in some embodiments, the adjustment of the phase and amplitude is performed for each of those reference signals by splitting the reference signal into a reference in-phase component and a reference quadrature component, correlating the reference in-phase component with the error signal to determine a reference in-phase weight, correlating the reference quadrature component with the error signal to determine a reference quadrature weight, weighting the reference in-phase component by the reference in-phase weight to generate an in-phase cancellation component, weighting the reference quadrature component by the reference quadrature weight to generate a quadrature cancellation component, and combining the in-phase cancellation component with the quadrature cancellation component to generate the respective cancellation signal.

Figure 4:
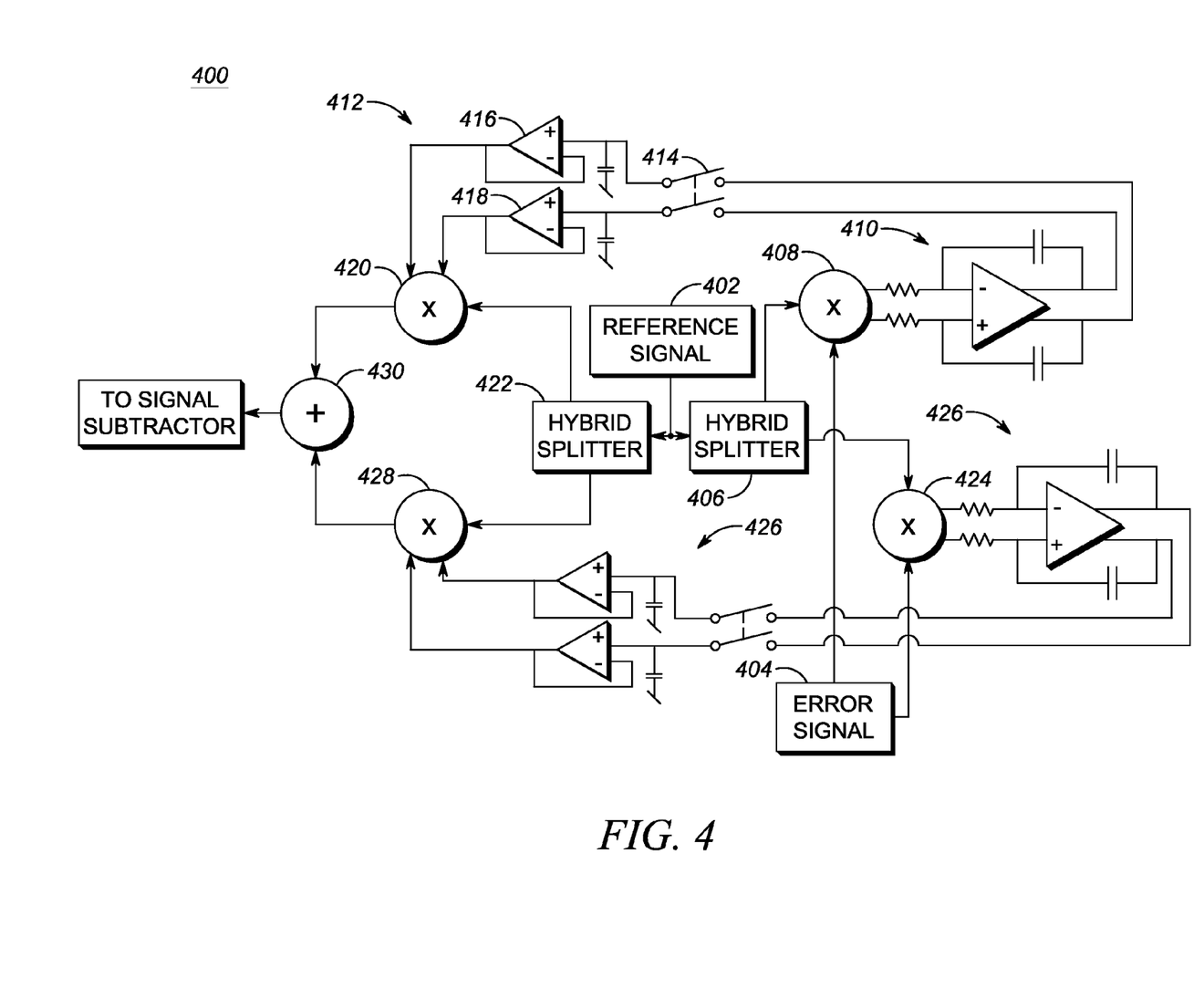
FIG. 4 is a block diagram of signal cancellation circuitry in in accordance with some embodiments.

One type of exemplary cancellation circuit, such as cancellation circuits 202 and 204, is a correlation canceller circuit 400 (also referred to herein as a correlation canceller), as illustrated in FIG. 4. A reference signal 402 and an error signal 404 are provided to the correlation canceller 400. A hybrid splitter 406 splits the reference signal into an in-phase component and a quadrature component. A multiplier 408 multiplies the in-phase component of the reference signal with the error signal to provide a differential output. The differential output is integrated by an op-amp integrator circuit 410 to generate a differential reference in-phase weight. In some embodiments, the integrator filter bandwidth is designed to be in the range of 1-5 kHz to provide a good tradeoff between acquisition time and loop stability.

The differential output of the op-amp integrator circuit 410 is supplied to hold/bypass circuit 412, which includes op-amp buffers 416 and 418. As will be described in further detail below, the hold/bypass circuit 412 can be used in the adaptive selection of delay values.

When the cancellation circuit is active, the switches 414 are closed, and the differential in-phase reference weight is supplied to a multiplier 420. A hybrid splitter 422 supplies the in-phase component of the reference signal to the multiplier 420. The multiplier 420 weights the in-phase component of the reference signal by the in-phase reference weight by multiplying them together to generate the in-phase component of the cancellation signal.

Analogous features are provided for the generation of the quadrature component of the cancellation signal. A multiplier 424 multiplies the quadrature component of the reference signal 402 by the error signal 404, and the product is supplied to an op-amp integrator circuit 426. The integrator 426 generates a differential reference quadrature weight, which passes through hold/bypass circuit 426 to a multiplier 428. The multiplier 428 multiplies the differential reference quadrature weight by the quadrature component of the reference signal from the hybrid splitter 422 to generate the quadrature component of the cancellation signal. An adder 430 is provided to add the in-phase and quadrature components of the cancellation signal to generate the cancellation signal. This cancellation signal is supplied to the signal subtractor to cancel at least a portion of the self-interference component of an incoming radio-frequency signal.

The correlation canceller is useful in providing cancelation involving many interference scenarios, particularly between LTE UE devices and public safety narrowband devices operating in the 700 MHz band. The correlation canceller is particularly useful in the scenario of an LTE 3GPP Band 13 (B13) signal interfering with a Public Safety narrowband (PSNB) 700 MHz receiver in an integrated LTE/PSNB dual-band transceiver.

When a dual-band transceiver is operated to simultaneously send an LTE signal and receive an PSNB signal, the incoming radio-frequency signal is the sum of the desired PSNB signal $s_d(t)$ and the undesired broadband LTE self-interference signal $s_u(t)$, such that the incoming radio-frequency signal $s_{rx}(t)$ can be represented by $s_{rx}(t)=s_d(t)+s_u(t)$. In the case of a single self-interference path, the signal $s_u(t)$ is a scaled and rotated version of the outgoing radio-frequency signal $s_{ref}(t)$, that is, $s_u(t)=ks_{ref}(t+\Phi)$, where $s_{ref}(t)$ further is coupled to the correlation canceller (e.g., via radio frequency coupling 108) and is used as a reference signal. More generally, in the case of multipath self-interference, $$s_{rx}(t)=s_d(t)+\Sigma_i k_i s_{ref}(t+\Phi_i-\tau_i),$$

where $\tau_i$ represents the travel time along the ith interference path, k corresponding to a scaling of the outgoing radio-frequency signal, and $\Phi_i$ represents any phase shift introduced by, for example, reflection along the ith interference path. The error signal described herein may be represented by e(t), and, as correlation canceller converges $s_d(t)=e(t)$, with the correlation canceller canceling out the undesired broadband interference portion of the received signal. The bandwidth of the tracking loop only needs to be wide enough to track to changes in the channel coupling between the reference broadband signal and the received interference broadband signal, not the broadband signal itself. This allows for a narrow loop bandwidth that minimizes noise coupled into the correlation canceller.

Each correlation canceller circuit includes two primary sections, an amplitude and frequency shifter, or weighter, and a correlator. The weighter includes a hybrid splitter, two weighting mixers and a summer, while the correlator includes a hybrid splitter, two mixers and two integrators. The output of the integrators creates the weighting factors used to both rotate and scale the reference signal to match the undesired input signal.

For a particular correlation canceller circuit, the desired, undesired and reference signals can be described by the following equations, wherein $\omega_c$ is a carrier frequency, A is a scaling factor, and $\theta(\Theta)$ is a phase component:

$$s_d(t)=A_d \cos[\omega_c t+\theta_d(t)],$$

$$s_u(t)=A_u \cos[\omega_c t+\theta_u(t)], \text{ and}$$

$$s_{ref}(t)=A_{ref} \cos[\omega_c t+\theta_{ref}(t)]$$

For simplicity, these equations describe a case in which the travel time $\tau$ is taken to be zero, although the extension of these equations to cases with nonzero travel time will be apparent to those skilled in the art. The undesired signal may be modeled as a scaled and rotated version of the reference signal that only varies slowly with time, that is, $\Theta_u(t)=\Theta_{ref}(t)+\Phi$ and $A_u=kA_{ref}$. Therefore to show that the canceller will remove the undesired broadband signal from the narrowband path it is sufficient to show that:

$$\hat{s}_u(t) \approx s_u(t)=A_u \cos[\omega_c t+\theta_u(t)]=kA_{ref} \cos[\omega_c t+\theta_{ref}(t)+\Phi]$$

In the correlation canceller, the reference in-phase weight can be represented by $W_I(t)$. The input to the in-phase inte grator is the output of the in-phase correlation multiplier, namely $s_{ref}(t)e(t)$, so:

$$\frac{dW_I(t)}{dt} = s_{ref}(t)e(t)$$

And e(t) is given by:

$$e(t)=s_d(t)+s_u(t)-\hat{s}_u(t)=s_d(t)+s_u(t)-\{W_I(t)s_{ref}(t)+W_Q(t)\mathcal{H}[s_{ref}(t)]\}$$

Where $\mathcal{H}[\bullet]$ denotes the Hilbert transform. Substituting and expanding for $s_d(t)$, $s_u(t)$ and $\hat{s}_u(t)$:

$$e(t) = A_d\cos[\omega_c t + \theta_d(t)] + A_u\cos[\omega_c t + \theta_u(t)] - \{W_I(t)A_{ref}\cos[\omega_c t + \theta_{ref}(t)] + W_Q(t)A_{ref}\sin[\omega_c t + \theta_{ref}(t)]\}$$

Now substituting e(t) into the first equation results in:

$$\frac{dW_I(t)}{dt} = A_{ref}\cos[\omega_c t + \theta_{ref}(t)]\{A_d\cos[\omega_c t + \theta_d(t)] + A_u\cos[\omega_c t + \theta_u(t)] - \{W_I(t)A_{ref}\cos[\omega_c t + \theta_{ref}(t)] + W_Q(t)A_{ref}\sin[\omega_c t + \theta_{ref}(t)]\}\}$$

Multiplying out and dropping the $2\omega_c$ terms (which are filtered out by the integrator) results in:

$$\frac{dW_I(t)}{dt} = \frac{A_{ref}A_d}{2}\cos[\theta_{ref}(t) - \theta_d(t)] + \frac{A_{ref}A_u}{2}\cos[\theta_{ref}(t) - \theta_u(t)] - \frac{A_{ref}^2 W_I(t)}{2} - \frac{A_{ref}^2 W_Q(t)}{2}(\sin 0)$$

Since the interference signal $\Theta_{ref}(t)$ is uncorrelated with the desired signal $\Theta_d(t)$, the first term will integrate to zero so it can be dropped out, and further noting that $\Theta_u(t)=\Theta_{ref}(t)+\Phi$ and $A_u=kA_{ref}$ results in:

$$\frac{dW_I(t)}{dt} = \frac{A_{ref}kA_{ref}}{2}\cos[\theta_{ref}(t) - \theta_{ref}(t) - \phi] - \frac{A_{ref}^2 W_I(t)}{2}$$

This equation can be re-written as the following first order differential equation:

$$\frac{dW_I(t)}{dt} = \frac{A_{ref}^2}{2}W_I(t) = \frac{kA_{ref}^2}{2}\cos(\phi)$$

Whose solution is given by:

$$W_I(t) = k\cos(\phi) + C_1 e^{-\frac{A_{ref}^2 t}{2}},$$

wherein $C_1$ is a constant.

A similar analysis can be performed for the reference quadrature weight $W_Q$:

$$\frac{dW_Q(t)}{dt} = \mathcal{H}[s_{ref}(t)]e(t)$$

Where $\mathcal{H}[\bullet]$ again denotes the Hilbert transform. Substituting for e(t) results in:

$$\frac{dW_Q(t)}{dt} = A_{ref}\sin[\omega_c t + \theta_{ref}(t)]\{A_d\cos[\omega_c t + \theta_d(t)] + A_u\cos[\omega_c t + \theta_u(t)] - \{W_I(t)A_{ref}\cos[\omega_c t + \theta_{ref}(t)] + W_Q(t)A_{ref}\sin[\omega_c t + \theta_{ref}(t)]\}\}$$

Again multiplying out and dropping the $2\omega_c$ terms as before results in:

$$\frac{dW_Q(t)}{dt} = \frac{A_{ref}A_d}{2}\sin[\theta_{ref}(t) - \theta_d(t)] + \frac{A_{ref}A_u}{2}\sin[\theta_{ref}(t) - \theta_u(t)] - \frac{A_{ref}^2 W_I(t)}{2}(\sin 0)\frac{A_{ref}^2 W_Q(t)}{2}(1 - 0)$$

Since the interference signal $\Theta_{ref}(t)$ is uncorrelated with the desired signal $\Theta_d(t)$, the first term will integrate to zero so it can be dropped out, and further noting that $\Theta_u(t)=\Theta_{ref}(t)+\Phi$ and $A_u=kA_{ref}$ this leads to:

$$\frac{dW_Q(t)}{dt} = \frac{A_{ref}kA_{ref}}{2}\sin[\theta_{ref}(t) - \theta_{ref}(t) - \phi] - \frac{A_{ref}^2 W_Q(t)}{2}$$

Which can be re-written as the following differential equation:

$$\frac{dW_Q(t)}{dt} = \frac{A_{ref}^2}{2}W_Q(t) = \frac{kA_{ref}^2}{2}\sin(\phi)$$

Whose solution is given by:

$$W_Q(t) = -k\sin(\phi) + C_2 e^{-\frac{A_{ref}^2 t}{2}}$$

wherein $C_2$ is a constant.

Remembering that $\hat{s}_u(t)$ is given by:

$$\hat{s}_u(t)=W_I(t)s_{ref}(t)+W_Q(t)\mathcal{H}[s_{ref}(t)]$$

Substituting for $W_I$, $W_Q$ and $s_{ref}$ results in:

$$\hat{s}_u(t) = \left[k\cos(\psi) + C_1 e^{-\frac{A_{ref}^2 t}{2}}\right]A_{ref}\cos[\omega_c t + \theta_{ref}(t)] + \left[-k\sin(\psi) + C_2 e^{-\frac{A_{ref}^2 t}{2}}\right]A_{ref}\sin[w_c t + \theta_{ref}(t)]$$

Collecting terms:

$$\hat{s}_u(t) = e^{-\frac{A_{ref}^2 t}{2}}\{C_1 A_{ref}\cos[\omega_c t + \theta_{ref}(t)] + C_2 A_{ref}\sin[w_c t + \theta_{ref}(t)]\} + kA_{ref}\cos(\phi)\cos[\omega_c t + \theta_{ref}(t)] - kA_{ref}\sin(\phi)\sin[\omega_c t + \theta_{ref}(t)]$$

In the steady state, the first transient response term will decay to zero, leaving just the following:

$$\hat{s}_u(t)=kA_{ref}\cos(\phi)\cos[\omega_c t+\theta_{ref}(t)]-kA_{ref}\sin(\phi)\sin[\omega_c t+\theta_{ref}(t)]$$

Lastly utilizing the trigonometric identity $\cos(A+B)=\cos(A)\cos(B)-\sin(A)\sin(B)$ results in:

$$\hat{s}_u(t)=kA_{ref}\cos[\omega_c t+\theta_{ref}(t)+\phi]$$

Therefore:

$$\hat{s}_u(t)\approx s_u(t)=kA_{ref}\cos[\omega_c t+\theta_{ref}(t)+\phi]$$

This result demonstrates that cancellation circuitry implemented as a correlation canceller circuit will cancel out self-interference in the steady state. This analytic evaluation of a single correlation canceller is complemented by simulation results using three correlation canceller circuits working with three unique delay values. In the simulation, the reference signal to the first correlation canceller had a delay value of zero, the reference signal to the second correlation canceller had a delay value of 260 ns, and the reference signal to the third correlation canceller had a delay value of 340 ns. For a simulated multipath interference path with a travel time of between 240 ns and 360 ns, the use of three cancellation circuits with predetermined delay values led to self-interference cancellation of around 50 dB. In contrast, the use of a single correlation canceller led to self-interference cancellation of only around 30 dB.

As demonstrated by the simulation results summarized above, a substantial amount of multipath interference can be canceled with the use of predetermined delay values, even when the delay values do not correspond precisely to the actual travel time associated with any particular multipath interference path. However, the effectiveness of the multipath cancellation can be improved by permitting adaptive selection of delay values using a technique such as that illustrated in FIG. 5.

Figure 5:
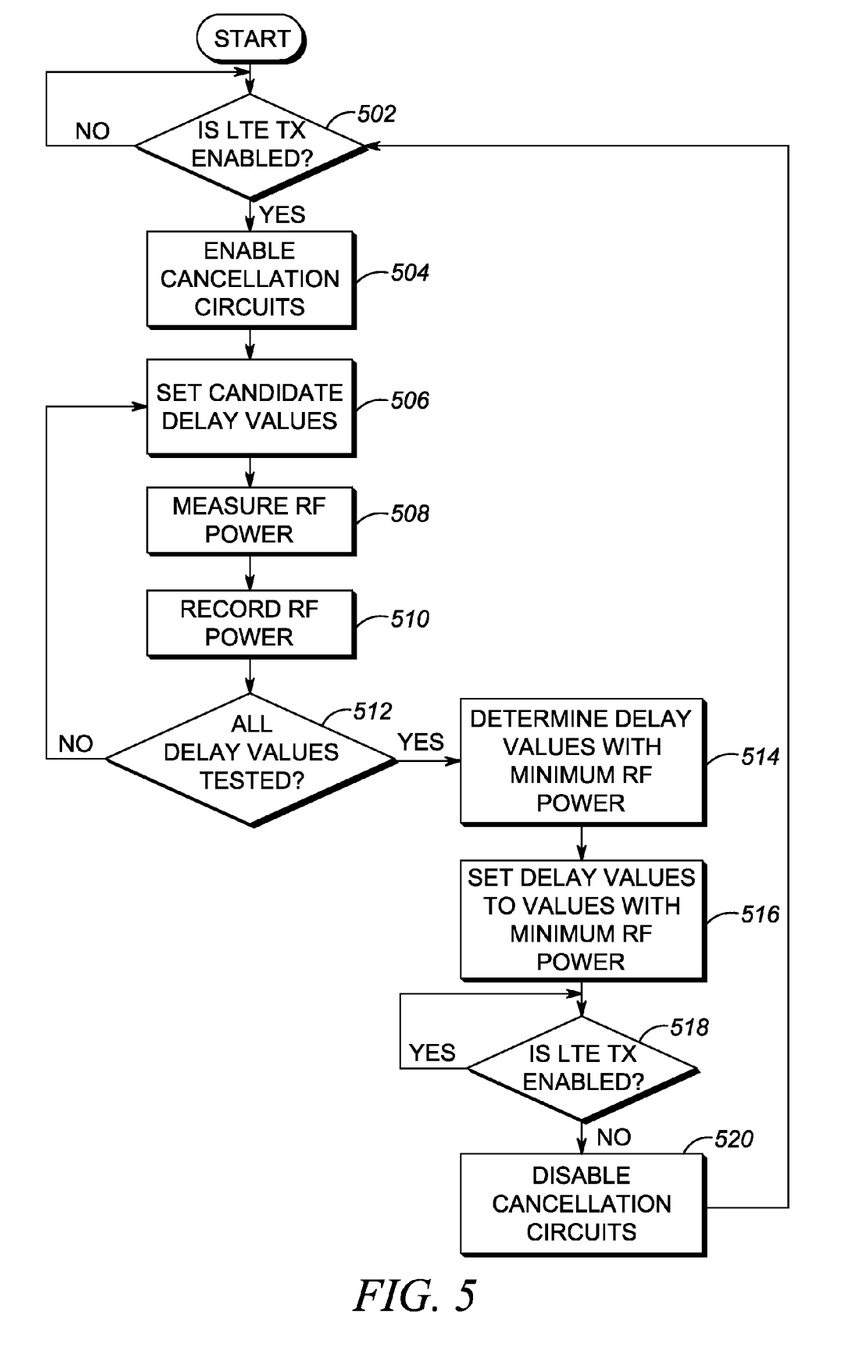
FIG. 5 is a flow diagram of a method for adaptively selecting delay values in accordance with some embodiments.

Referring now to FIG. 5, in step 502, a transceiver, such as transceiver 100, determines whether transmission of the outgoing radio-frequency signal has been initiated. For example, the transceiver may determine whether an LTE TX enable flag is set for transmission of an LTE uplink signal. In some embodiments, the transceiver may operate only in response to the initiation of transmission in certain bands, such as LTE 3GPP Band 13.

In step 504, in response to the initiation of transmission, cancellation circuits of the transceiver, such as cancellation circuits 122, 124, and 126 of transceiver 100, are enabled. In some embodiments, the enabling of the cancellation circuits may be performed by closing switches (such as switches 414) of hold/bypass circuits (such as hold/bypass circuits 412, 426). In step 506, the transceiver tries a first set of candidate delay values for the different reference signals. In step 508, the transceiver, for example, radio-frequency power detector 136 of transceiver 100, measures the radio-frequency power of the resulting error signal. In step 510, the transceiver records the radio-frequency power associated with the first set of candidate delays, for example, by storing the measured radio-frequency power in memory 140. The transceiver then cycles through different sets of candidate delay values, measuring and recording the radio-frequency power of the error signal resulting from each of those candidate sets of delay values. Once the transceiver has determined in step 512 that all the candidate delay values have been tested, the transceiver identifies, in step 514, which of the candidate sets of delay values resulted in the minimum radio-frequency power of the error signal. In step 516, the transceiver sets the delay values of the reference signals to the set of delay values that resulted in the lowest value of the error signal radio-frequency power. In step 518, the transceiver determines whether outgoing radio-frequency signals are still being transmitted. If not, the transceiver may disable the cancellation circuits in step 520.

The sets of candidate delay values tested by the transceiver may include candidate delay values ranging between, for example 0 ns and 500 ns. To limit the number of permutations being tested, a limited number of candidate delay values may be used for each reference signal. For example, only four or five different delay values may be tested for each reference signal. In some embodiments, one or more of the delay values may not be variable. For example, a transceiver with three cancellation circuits may make use of a first reference signal with a fixed delay value of zero, while the second and third delay values are variable. In such an embodiment, the transceiver may test, for example, five different levels for each delay value. While testing all such combinations would give twenty-five possible sets, the transceiver may exclude from testing any candidate set in which the two delay values are the same, or those sets which are merely a symmetric duplicate of some other set, which would leave only ten candidate sets for testing.

The steps used to set the delay may be performed under the direction of software instructions saved in the memory 140 by the delay determination module 142 (FIG. 1). As an alternative to adaptive testing, the transceiver may store default delay values to be used in different conditions.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   receiving an incoming radio-frequency (RF) signal, wherein the incoming RF signal includes a self-interference component generated by the transmission of an outgoing radio-frequency signal;
   creating a plurality of reference signals from the outgoing RF signal, wherein each of the reference signals is a replica of the outgoing RF signal, and wherein each of the reference signals has a unique delay value with respect to the outgoing RF signal;
   for each of the plurality of reference signals;
   splitting the reference signal into a reference RF in-phase component and a reference RF quadrature component,
   determining amplitude and phase adjustments based on the reference RF in-phase and quadrature components by correlating the reference RF in-phase component with an error signal to determine a reference in-phase weight and correlating the reference RF quadrature component with the error signal to determine a reference quadrature weight,
   adjusting an amplitude and phase of the reference RF in-phase and quadrature components by weighting the reference RF in-phase component by the reference in-phase weight to generate an RF in-phase cancellation component and weighting the reference RF quadrature component by the reference quadrature weight to generate a RF quadrature cancellation component,
   combining the RF in-phase cancellation component with the RF quadrature cancellation component to generate an RF cancellation signal; and
   creating the error signal by combining the plurality of respective RF cancellation signals with the incoming RF signal and cancelling at least a portion of the self-interference component based on the error signal.

2. The method of claim 1, wherein the delay value of at least one of the reference signals is at least ten times greater than the period of the outgoing radio-frequency signal.

3. The method of claim 1, wherein the delay value of at least one of the reference signals is at least 10 ns.

4. The method of claim 1, wherein the RF signal is a Long Term Evolution (LTE) uplink signal, and wherein the incoming RF signal includes a desired RF component in the group consisting of: the 700 MHz public safety spectrum and the 800 MHz public safety spectrum.

5. A method comprising:
   generating an outgoing radio-frequency (RF) signal;
   transmitting the outgoing RF signal;
   receiving an incoming RF signal, wherein the incoming RF signal includes a self-interference component caused by the transmission of the outgoing RF signal;
   replicating the outgoing RF signal to generate a first reference signal;
   splitting the first reference signal into a reference RF in-phase component and a reference RF quadrature component;
   determining amplitude and phase adjustments for the first reference signal by correlating the reference RF in-phase component of the first reference signal with an error signal to determine a reference in-phase weight for the first reference signal and correlating the reference RF quadrature component of the first reference signal with the error signal to determine a reference quadrature weight for the first reference signal;
   adjusting the amplitude and phase of each of the reference RF in-phase component and the reference RF quadrature component of the first reference signal based on the amplitude and phase adjustments determined for the first reference signal by weighting the reference RF in-phase component of the first reference signal by the reference in-phase weight for the first reference signal to generate an in-phase RF cancellation component and weighting the reference RF quadrature component of the first reference signal by the reference quadrature weight for the first reference signal to generate a quadrature RF cancellation component;

combining the in-phase RF cancellation component with the quadrature RF cancellation component determined for the first reference signal to generate a first RF cancellation signal;

creating at least a second reference signal by introducing a first delay in the outgoing RF signal;

splitting the second reference signal into a reference RF in-phase component and a reference RF quadrature component;

determining amplitude and phase adjustments for the second reference signal by correlating the reference RF in-phase component of the second reference signal with the error signal to determine a reference in-phase weight for the second reference signal and correlating the reference RF quadrature component of the second reference signal with the error signal to determine a reference quadrature weight for the second reference signal;

adjusting the amplitude and phase of each of the reference RF in-phase component and the reference RF quadrature component of the second reference signal based on the amplitude and phase adjustments determined for the second reference signal by weighting the reference RF in-phase component of the second reference signal by the reference in-phase weight for the second reference signal to generate an in-phase RF cancellation component and weighting the reference RF quadrature component of the second reference signal by the reference quadrature weight for the second reference signal to generate a quadrature RF cancellation component;

combining the in-phase RF cancellation component with the quadrature RF cancellation component determined for the second reference signal to generate a second RF cancellation signal; and creating the error signal by combining at least the first and second RF cancellation signals with the incoming RF signal and cancelling at least a portion of the self-interference component based on the error signal.

6. The method of claim 5, wherein the length of the first delay is at least 10 times greater than the period of the outgoing RF signal.

7. The method of claim 5, wherein the length of the first delay is at least 10 ns.

8. The method of claim 5, wherein the first delay is a predetermined delay.

9. The method of claim 5, further comprising determining the first delay by:
adaptively testing a plurality of candidate delays;
for each candidate delay, measuring the power of the error signal; and
selecting the candidate delay associated with the lowest value of the error signal power.

10. The method of claim 5, further comprising:
creating a third reference signal by introducing a second delay in the outgoing RF signal;
splitting the third reference signal into a reference RF in-phase component and a reference RF quadrature component;
determining amplitude and phase adjustments for the third reference signal based on the reference RF in-phase and quadrature components of the third reference signal;
adjusting the amplitude and phase of each of the reference RF in-phase component and the reference RF quadrature component of the third reference signal based on the amplitude and phase adjustments determined for the third reference signal to generate a third RF cancellation signal;
wherein the creation of the error signal is performed by combining at least the first, second, and third RF cancellation signals with the incoming RF signal; and
wherein the adjustment of the amplitude and phase of the third reference signal is based on the error signal.

11. The method of claim 10, wherein the first and second delays are determined by:
adaptively testing a plurality of candidate sets of first and second delays;
for each candidate set of first and second delays, measuring the power of the error signal; and
selecting the candidate set of first and second delays associated with the lowest value of the error signal power.

12. The method of claim 11, wherein the adaptive testing is performed in response to an initiation of the transmission of the RF signal.

* * * * *